US010459431B2

(12) United States Patent
Wu et al.

(10) Patent No.: US 10,459,431 B2
(45) Date of Patent: Oct. 29, 2019

(54) THREE-DIMENSIONAL PRINTING APPARATUS AND METHODS FOR PRINTING AND RELEASING THREE-DIMENSIONAL WORKPIECE

(71) Applicant: Young Optics Inc., Hsinchu (TW)

(72) Inventors: Li-Han Wu, Hsinchu County (TW); Yea-Ru Sheu, Hsinchu (TW); Ming-Feng Ho, Hsinchu (TW); Chao-Shun Chen, Hsinchu County (TW)

(73) Assignee: YOUNG OPTICS INC., Hsinchu (TW)

( * ) Notice: Subject to any disclaimer, the term of this patent is extended or adjusted under 35 U.S.C. 154(b) by 543 days.

(21) Appl. No.: 15/065,137

(22) Filed: Mar. 9, 2016

(65) Prior Publication Data

US 2017/0192412 A1    Jul. 6, 2017

(30) Foreign Application Priority Data

Dec. 31, 2015   (TW) .............................. 104144758 A

(51) Int. Cl.
| | | |
|---|---|---|
| *G06F 19/00* | (2018.01) | |
| *G05B 19/4099* | (2006.01) | |
| *B33Y 10/00* | (2015.01) | |
| *B29C 64/124* | (2017.01) | |

(52) U.S. Cl.
    CPC ........ *G05B 19/4099* (2013.01); *B29C 64/124* (2017.08); *B33Y 10/00* (2014.12); *G05B 2219/49023* (2013.01)

(58) Field of Classification Search
    CPC ...... G05B 19/4099; G05B 2219/49023; B29C 64/124; B33Y 10/00

USPC .......................................................... 700/118
See application file for complete search history.

(56) References Cited

U.S. PATENT DOCUMENTS

| | | | | |
|---|---|---|---|---|
| 5,192,559 A | | 3/1993 | Hull et al. | |
| 5,447,822 A | * | 9/1995 | Hull ...................... | B29C 64/135 |
| | | | | 264/401 |
| 6,267,919 B1 | * | 7/2001 | Tanaka .................... | B29C 64/40 |
| | | | | 264/401 |
| 6,607,689 B1 | * | 8/2003 | Farnworth ............ | B29C 64/135 |
| | | | | 264/401 |

(Continued)

FOREIGN PATENT DOCUMENTS

TW           515755         1/2003

*Primary Examiner* — Tha-O H Bui
(74) *Attorney, Agent, or Firm* — WPAT, PC

(57) ABSTRACT

A three-dimensional printing apparatus includes a liquid tank, a curing platform and a light source device. A bearing member of the liquid tank is air proof, and forms an accommodating space with a side wall of the liquid tank. The curing platform is disposed at a first side of the bearing member corresponding to the accommodating space for allowing a workpiece to be cured on a surface thereof. After the accommodating space accommodates a liquid material, a curing light beam provided by a light source device disposed at a second side of the bearing member opposite to the accommodating space cures at least part of the liquid material on a surface of the curing platform via the bearing member. The use of a solid release material between the curing platform and the bearing member may be omitted. Methods for printing and releasing a three-dimensional workpiece are also provided.

9 Claims, 3 Drawing Sheets

(56) References Cited

U.S. PATENT DOCUMENTS 7,195,472 B2     3/2007   John
7,438,846 B2    10/2008   John

* cited by examiner

THREE-DIMENSIONAL PRINTING APPARATUS AND METHODS FOR PRINTING AND RELEASING THREE-DIMENSIONAL WORKPIECE

FIELD OF THE INVENTION

The present invention relates to a printing apparatus, a printing method, and a releasing method; and more particularly, to a three-dimensional printing apparatus with a liquid release layer, and a method of utilizing the three-dimensional printing apparatus for printing and releasing a three-dimensional workpiece.

BACKGROUND OF THE INVENTION

In conventional light curing three-dimensional (3D) printing devices, a solid release film and a bearing member for supporting the solid release film are disposed on the bottom of a tank for accommodating photosensitive resins. In printing of a workpiece, the photosensitive resins would be cured to form a layer of the workpiece and attach to the solid release film (e.g. a plastic film or a flexible silicone block). To initiate printing of the following layer, applying a force to lift up the workpiece is required to separate the workpiece from the solid release film and allow liquid photosensitive resins to refill between the workpiece and the solid release film. However, low-pressure vacuum would build up between the solid release film and the workpiece during printing, therefore causing difficulties in separating the workpiece from the solid release film.

While increasing the uplift force may seem to solve the technical difficulties, application of strong uplift forces often leads to damage of the workpiece and deformation of the solid release film, affecting the quality and efficiency of printing. In recent years, a team called "CARBON3D" has developed a 3D printing technique, commonly known as C.L.I.P. C.L.I.P. involves pouring a single light curable material into a curing tank and dissolving oxygen from a breathable material disposed at the bottom of the tank into the lower portion of the light curable material to avoid light curing thereof. Light would then enter and cure the upper portion of the light curable material in which oxygen concentration is relatively low. While the C.L.I.P. technique should have significantly sped up the printing process, accumulation and diffusion of oxygen at the lower portion become uncontrollable when working continuously over a certain period of time. Consequently, C.L.I.P. has yet to be utilized in industrial productions.

BRIEF SUMMARY OF THE INVENTION

The present invention provides a three-dimensional printing apparatus for facilitating the separation of a workpiece from a second liquid.

The present invention also provides a method for printing three-dimensional workpieces for facilitating the separation of the workpiece from the second liquid.

An embodiment of the present invention provides a three-dimensional printing apparatus, which includes a liquid tank, a curing platform, and a light source device. The liquid tank includes a bearing member and a side wall; the bearing member connects to at least the side wall to form an accommodating space; the bearing member has a first side corresponding to the accommodating space and a second side opposite thereto; the bearing member is air proof, and no removable solid release material is disposed thereon. The curing platform is disposed at the first side of the bearing member for allowing a workpiece to be cured on a surface thereof. The light source device is disposed at the second side of the bearing member for providing a curing light beam. A curing process is adopted to be processed by the three-dimensional printing apparatus. The curing process includes the steps of: accommodating a liquid material by the accommodating space; curing at least part of the liquid material on the surface of the curing platform by the curing light beam via the bearing member; and releasing the cured material by increasing distance between the curing platform and the light source. No removable solid release material is utilized in the whole curing process.

In sum, the present invention replaces the solid release film with a liquid material, so that workpiece damage is avoided, speed and stability of three-dimensional printing are improved, and precision of workpiece measurements is enhanced.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
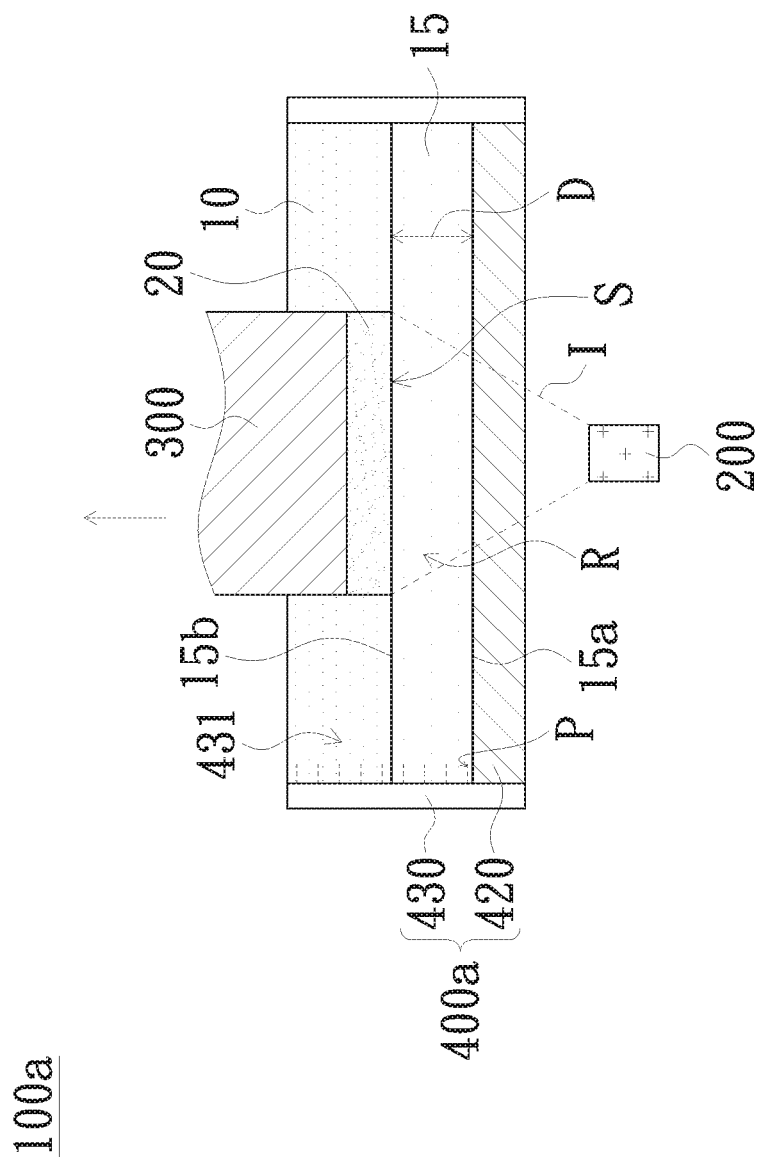
FIG. 1 is a schematic illustration of a three-dimensional printing apparatus according to an embodiment of the present invention.
Figure 2:
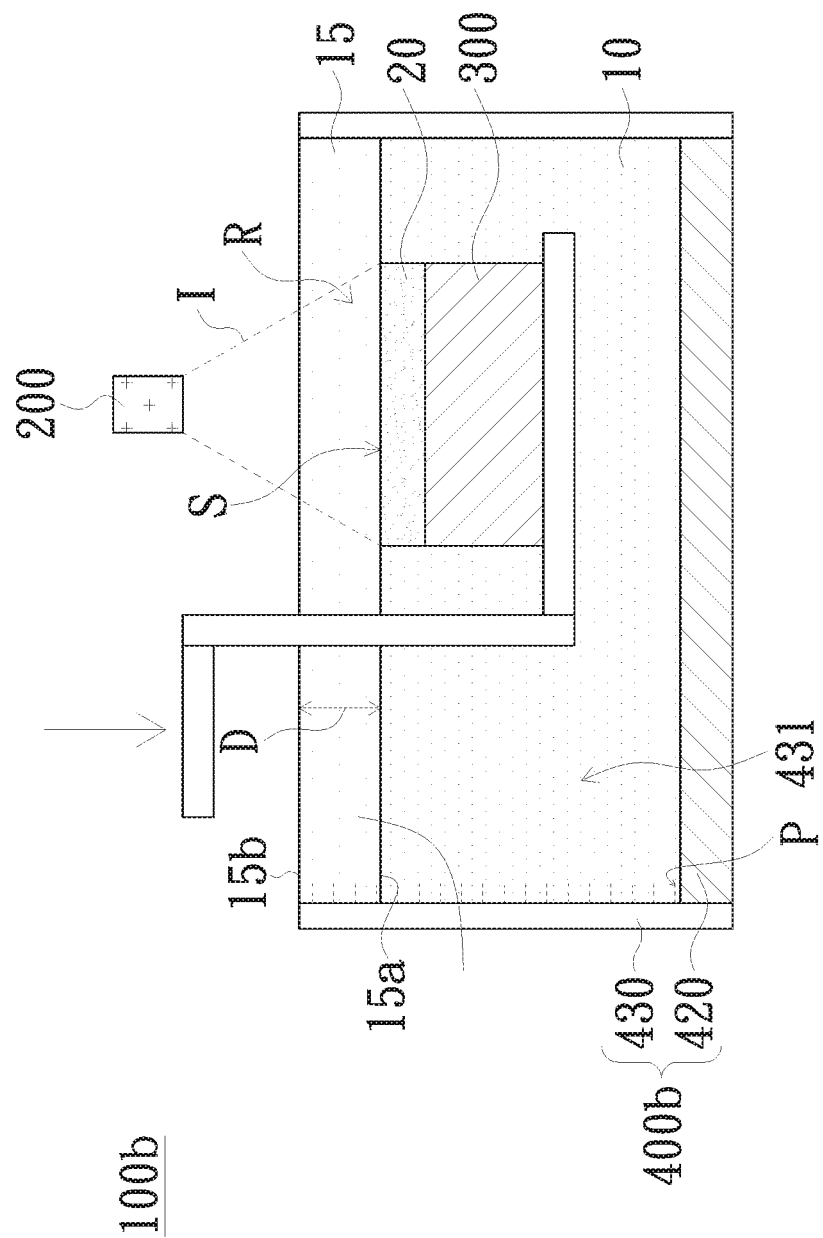
FIG. 2 is a schematic illustration of a three-dimensional printing apparatus according to another embodiment of the present invention.
Figure 3:
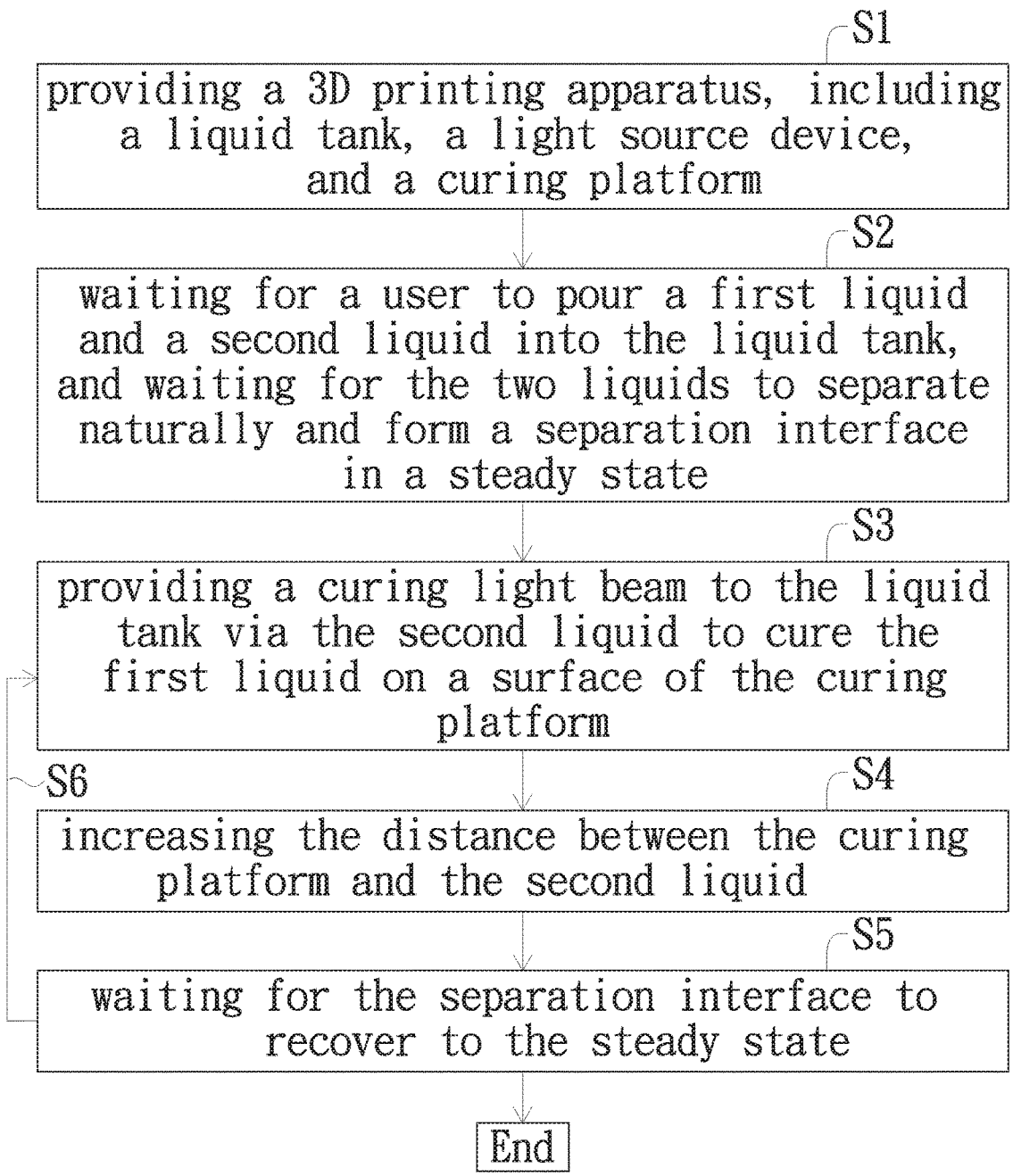
FIG. 3 is a flowchart of a method for printing a three-dimensional workpiece according to an embodiment of the present invention.

Referring now to FIG. 1 through FIG. 3. As illustrated in FIG. 1, a three-dimensional (3D) printing apparatus 100*a* of the present embodiment includes a light source device 200, a curing platform 300, and a liquid tank 400*a*.

The liquid tank 400*a* includes a bearing member 420 and a side wall 430 surrounding the bearing member 420. In this embodiment, the bearing member 420 and the side wall 430 form an accommodating space 431 for accommodating a first liquid 10, a second liquid 15 and other components. The accommodating space 431 is not only limited to be formed by the combination of the bearing member 420 and the side wall 430. A plurality of scales P may be marked on the side wall 430, with the minimum distance between two adjacent scales being 1 mm to 5 mm, so as to allow a user to estimate the depth and quantity of each material layer. The bearing member 420 may be made of light transmissive materials. However, the bearing member 420 is not air permeable;

more specifically, the bearing member 420 is made of air proof materials that block passage of gas from one side of the bearing member 420 to another through pores or man-made through holes thereon. In this embodiment, the bearing member may optionally be a component without vent holes, continuous pores, or other structures for venting air or gas molecules. Additionally, the liquid tank 400a may not include any air providing components. Furthermore, the bearing member 420 may be made of materials with poor releasability and needs not be disposed with any removable solid release material on its surface.

In this embodiment, the light source device 200 includes, but is not limited to, a digital light processing (DLP) ultraviolet projection component; the light source device may also be on liquid crystal display (LCD) projector or other types of projection device that output a curing light beam I with a wavelength falling mainly within the ultraviolet range. In this embodiment, the curing platform 300 is connected to a moveable cantilever (not shown in figure) for driving the curing platform 300 to stably move back and forth along a specific direction. Furthermore, the curing platform 300 includes a curing surface for allowing a workpiece to cure thereon.

In the present embodiment, the second liquid 15 is disposed between the bearing member 420 and the first liquid 10. The first liquid 10 is a light curable liquid resin, and the second liquid 15 includes perfluoropolyether (PFPE). More specifically, the first liquid 10 may be "Fluoroguard PRO", a multifunctional polymer additives manufactured by DuPont; and the second liquid 15 may be "Castable Blend", a photosensitive resin manufactured by FunToDo for 3D printing. However, in addition to the two products, materials that comply with the following criteria may also be chosen as the first liquid and the second liquid. The first liquid 10 and the second liquid 15 are substantially immiscible; that is, completely immiscible or poorly miscible. In an embodiment, the first liquid 10 and the second liquid 15 significantly differs in their polarities, so that the first liquid 10 and the second liquid 15 are substantially immiscible and a clear separation interface S is formed between the two liquids 10 and 15. For example, the second liquid 15 is polar while the first liquid is non-polar; alternatively, the second liquid 15 is non-polar while the first liquid 10 is polar.

Moreover, generally speaking, specific gravity of PFPE is about 1.6-2.1, and specific gravity of photosensitive resin for 3D printing is roughly 0.9-1.5. While various combinations are plausible, specific gravity C1 of the first liquid 10 is preferably at least 1.2 times greater than specific gravity C2 of the second liquid 15. Furthermore, depth D of the second liquid 15 may vary; for example, the present invention is operable when the depth D is at least 0.5 mm; and the depth D is more preferable between 1 mm to 40 mm, and is most preferable between 1 mm and 3 mm. It is to be understood that the depth of the second liquid 15 is preferably, but unnecessarily, at least 0.5 mm, for that the first liquid 10 when agitated may overcome resistance of the second liquid 15 and attach to the surface of the bearing member 420 if the second liquid 15 is too shallow, thus causing failure of the following printing steps.

While the second liquid 15 is preferably transparent, the present invention does not limit the light transmittance of the second liquid 15. In actual implementation, the light transmittance of the second liquid 15 is preferably at least 85%, so that energy of the curing light beam I provided by the light source device 200 may stably transmit to the first liquid 10.

Configuration of the present embodiment is provided as follows. The curing platform 300 is disposed at a side of the bearing member 420 corresponding to the first liquid 10 and the second liquid 15, and the light source device 200 is disposed on another side of the bearing member 420; that is, the bearing member 420 is disposed between the light source device 200 and the curing platform 300. The curing platform 300 is configured to move the curing surface back and forth in a normal direction of the surface of the bearing member 420 corresponding to the liquids; however, the direction of movement of the curing platform 300 is not limited thereto.

To implement the present embodiment, the aforementioned 3D printing apparatus 100a is provided (Step S1). Firstly, wait for a user to pour the first liquid 10 and the second liquid 15 into the liquid tank 400a, then the curing platform 300 is immersed in the first liquid 10 and let sit at a position away from the separation interface S for a default distance to wait for the first liquid 10 and the second liquid 15 to naturally separate into two layers due to their distinct specific gravities, polarities, or other physical properties and form the separation interface S in a steady state (Step S2). The default distance may equal the thickness of the workpiece; in this embodiment, the default distance is roughly 0.5 mm. Unlike the interface between gas gradients in CARBON3D, the first liquid 10 and the second liquid 15 of the present embodiment are two compounds with different physical properties, and the interface may be visually distinguishable when the two liquids exhibit different colors. It is to be understood that the present invention does not limit the order of the first liquid 10 and the second liquid 15 entering the liquid tank 400a; after the first liquid 10 and the second liquid 15 are poured, in no particular order, into the liquid tank 400a, the first liquid 10 and the second liquid 15 would naturally separate due to their distinct polarities and specific gravities, resulting in the second liquid 15 disposed between the first liquid 10 and the light source 200 and thus forming a steady and clear separation interface S between the two liquids 10 and 15.

After the first liquid 10 and the second liquid 15 are separated, a curing light beam I is emitted toward the liquid tank 400a so that the curing light beam I passes through the second liquid 15 and cures the first liquid 10 on the surface of the curing platform 300 (Step S3). Meanwhile, a side of the resulting workpiece 20 is in contact with the second liquid 15. More specifically, a workpiece curing area R is defined at the separation interface S between the first liquid 10 and the second liquid 15; when the curing light beam I emitted by the light source device 200 passes through the bearing member 420 and the second liquid 15 and reaches the workpiece curing area R, the first liquid 10 is irradiated by the curing light beam I and cured on the curing platform 300 to form the workpiece 20. Exposure intensity of the curing light beam I is 1 $mW/cm^2$ in this embodiment, but may vary by material of choice and speed and precision of the printing process.

After a first layer of the workpiece is formed on the curing platform 300, the curing platform 300 moves away from the light source device 200 or the second liquid 15 to separate the workpiece 20 from the second liquid 15 (Step S4). As the separation of the workpiece 20 from the second liquid 15 would cause agitation of the first liquid 10, it is preferred to let the liquids sit until the interface between the first liquid 10 and the second liquid 15 come to a steady state (Step S5) before repeating the aforementioned curing and adjusting steps to complete printing of the entire workpiece (Step S6). While the present invention does not limit the viscosity of the first liquid 10 and the second liquid 15, liquids with low viscosity are more preferable. The present invention is operable when the viscosity of the first liquid 10 and the second liquid 15 is lower than 3000 cps; however, in the present embodiment, viscosity of lower than 1000 cps is more preferable, and viscosity of lower than 100 cps is most preferable. The rationale is that low viscosity of the liquids would allow fast recovery of surface agitation when the workpiece 20 is released from the second liquid 15 and avoid continuous displacement caused by differential pressure.

As the release layer is the second liquid 15, the workpiece 20 can be easily released from the second liquid 15. Additionally, line width of the workpiece 20 is preferably smaller than 0.5 mm when the aforementioned materials and parameters are adopted. However, the present invention does not limit the line width of the workpiece 20, and the line width may vary by different parameters and materials of choice.

Finally, in addition to omission of the release layer, the present invention does not require any component or design for providing gas. Consequently, the present invention enables continuous batch production without having to precisely control any gas concentration, demonstrating the advantages of the present invention over CARBON3D's CLIP design.

To distinguish from another embodiment provided hereafter, the second liquid 15 of this embodiment is defined as having a first surface 15*a* and a second surface 15*b* opposite to the first surface 15*a*. The first surface 15*a* contacts the bearing member 420, and the second surface 15*b* forms an interface with the first liquid 10 due to the immiscibility between the second liquid 15 and the first liquid 10.

Referring now to FIG. 2, which illustrates a 3D printing apparatus according to another embodiment of the present invention. Configuration of the 3D printing apparatus 100*b* of this embodiment as shown in FIG. 2 is substantially identical to that of the 3D printing apparatus illustrated in FIG. 1, except for that the direction of actuation of this embodiment is reversed. Meanwhile, in a liquid tank 400*b* of the present embodiment, the specific gravity C2 of the second liquid 15 is smaller than the specific gravity C1 of the first liquid 10; therefore, the first liquid 10 is disposed between the bearing member 420 and the second liquid 15. C1 is preferably at least 1.2 times greater than C2; more specifically, the first liquid 10 may be silicone oil with a specific gravity of roughly 0.8-1, and the second liquid 15 may be a photosensitive resin with a specific gravity of roughly 1.1-1.5. In an example, silicone oil with a specific gravity of about 0.95 and photosensitive resins with a specific gravity of about 1.15 are adopted.

In the present embodiment, the second liquid 15 has a first surface 15*a* and a second surface 15*b* opposite to the first surface 15*a*. The first surface 15*a* faces the bearing member 420 and covers the first liquid 10. Furthermore, the light source device 200 is disposed over the liquid tank 400*b* for providing the curing light beam I that passes through the second liquid 15 and irradiates the workpiece curing area R. The second liquid 15 would not be cured upon irradiation, whereas the first liquid 10 is cured by the curing light beam I to form a workpiece 20 in the workpiece curing area R.

The second liquid 15 may include PFPE. The curing platform 300 would move downward and away from the second liquid 15 to separate the workpiece 20 from the second liquid 15. As the release layer of the present embodiment is the second liquid 15, the workpiece 20 formed in the first liquid 10 would not closely attach to the second liquid 15, therefore can be easily separated from the second liquid 15; meanwhile, the first liquid 10 would fill between the workpiece 20 and the second liquid 15 for initiating the following printing steps.

According to the aforementioned embodiments, the present invention utilizes the separation interface formed between the first liquid and the second liquid that are substantially immiscible for releasing the workpiece. Consequently, separation of the resulting workpiece from the release layer would not cause vacuum suction, thus achieving the aims of avoiding workpiece damage, improving layering and stability of 3D printing, and enhancing precision of workpiece measurements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional printing apparatus, comprising:
   a liquid tank, comprising a bearing member and a side wall, the bearing member connecting to at least the side wall to form an accommodating space, the bearing member having a first side corresponding to the accommodating space and a second side opposite thereto, the bearing member being air proof and no removable solid release material is disposed thereon;
   a curing platform, disposed at the first side for allowing a workpiece to be cured on a surface thereof; and
   a light source device, disposed at the second side for providing a curing light beam,
   a first liquid, being a light curing material; and
   a second liquid, being a liquid form release material;
   wherein, a curing process is adopted to be processed by the three-dimensional printing apparatus, the curing process comprises the steps of: accommodating the first liquid material and the second liquid by the accommodating space; curing at least part of the liquid material on the surface of the curing platform by the curing light beam via the bearing member; and releasing the cured material by increasing distance between the curing platform and the light source, while no removable solid release material film is utilized in the whole curing process,
   wherein, in the curing process, the second liquid is disposed between the light source device and the first liquid, a separation interface is formed between the first liquid and the second liquid.

2. The three-dimensional printing apparatus according to claim 1, wherein a specific gravity of the first liquid is at least 1.2 times greater than a specific gravity of the second liquid.

3. The three-dimensional printing apparatus according to claim 1, wherein a specific gravity of the second liquid is at least 1.2 times greater than a specific gravity of the first liquid.

4. The three-dimensional printing apparatus according to claim 1, wherein the second liquid comprises perfluoropolyether.

5. The three-dimensional printing apparatus according to claim 4, wherein a viscosity of the second liquid is lower than 1000 cps.

6. The three-dimensional printing apparatus according to claim 1, wherein a polarity of the first liquid is opposite to a polarity of the second liquid.

7. The three-dimensional printing apparatus according to claim 1, wherein the second liquid forms a layer having a thickness ranging between 1 mm and 3 mm.

8. The three-dimensional printing apparatus according to claim 1, wherein a light transmittance of the second liquid is at least 85%.

9. The three-dimensional printing apparatus according to claim 1, wherein the light source device comprises an ultraviolet projection component.

* * * * *